United States Patent [19]

Tenberge et al.

[11] Patent Number: 5,080,637
[45] Date of Patent: Jan. 14, 1992

[54] HYDROSTATIC-MECHANICAL POWER-DISTRIBUTION TRANSMISSION

[75] Inventors: Peter Tenberge, Fürth; Abdul Arain, Thyrnau, both of Fed. Rep. of Germany

[73] Assignee: Zahnradfabrik Friedrichshafen AG, Friedrichshafen, Fed. Rep. of Germany

[21] Appl. No.: 585,121
[22] PCT Filed: Mar. 31, 1989
[86] PCT No.: PCT/EP89/00348
   § 371 Date: Sep. 27, 1990
   § 102(e) Date: Sep. 27, 1990
[87] PCT Pub. No.: WO89/09899
   PCT Pub. Date: Oct. 19, 1989

[30] Foreign Application Priority Data

Apr. 6, 1988 [DE] Fed. Rep. of Germany ....... 3811508

[51] Int. Cl.$^5$ ............................................. F16H 47/04
[52] U.S. Cl. .......................................... 475/81; 475/72; 475/219; 475/290; 475/330
[58] Field of Search .................. 475/72, 79, 81, 219, 475/290, 330

[56] References Cited

U.S. PATENT DOCUMENTS

| | | | |
|---|---|---|---|
| 4,164,156 | 8/1979 | Reed | 475/81 X |
| 4,184,385 | 1/1980 | Maeda | 475/81 |
| 4,232,568 | 11/1980 | Maeda | 475/81 |
| 4,341,131 | 7/1982 | Pollman | 475/81 |
| 4,368,653 | 1/1983 | Mizuno et al. | 475/81 X |
| 4,754,664 | 7/1988 | Dick | 475/81 |
| 4,763,543 | 8/1988 | Harada et al. | 475/219 X |

*Primary Examiner*—Leslie A. Braun
*Assistant Examiner*—Matthew Stavish
*Attorney, Agent, or Firm*—Herbert Dubno; Yuri Kateshou

[57] ABSTRACT

A hydrostatic-mechanical power-distribution transmission with infinitely variable gear ratio in the hydrostatic branch and several ratios in the mechanical branch, which downstream of the coupling gear has shiftable planetary reduction gears for the purpose of reducing the power contribution of the hydrostatic branch in the starting range.

7 Claims, 1 Drawing Sheet

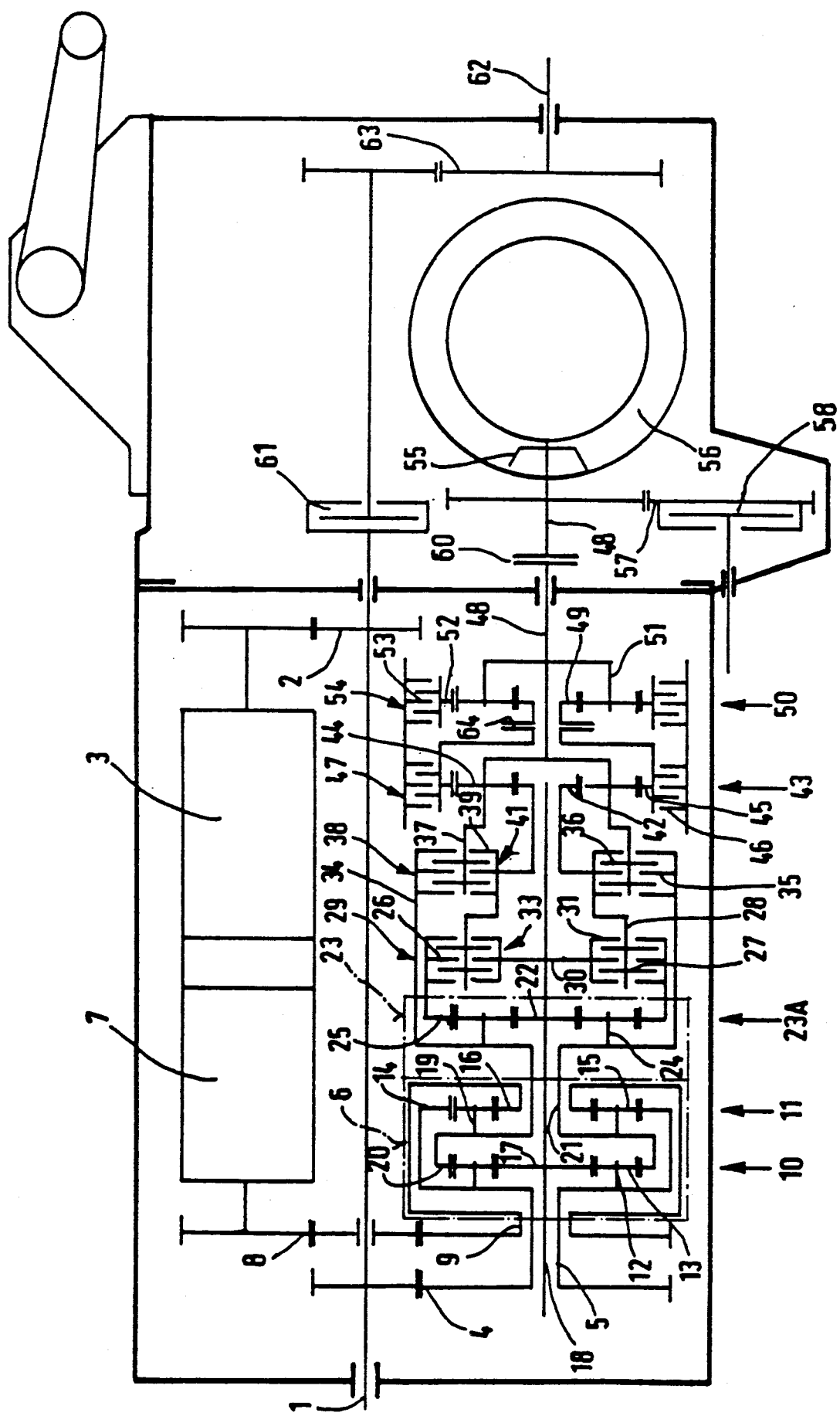

HYDROSTATIC-MECHANICAL POWER-DISTRIBUTION TRANSMISSION

CROSS REFERENCE TO RELATED APPLICATIONS

This application is a national phase of PCT/EP89/00348 filed 31 March 1989 and based, in turn, upon German National Application P 38 11 508.5 of 6 April 1988 under the International Convention.

FIELD OF THE INVENTION

The invention refers to a hydrostatic-mechanical power-distribution transmission, whose mechanical power branch as well as hydrostatic power branch are driven on the input side by a common driving shaft and on the output side are summed in a first, four-shaft coupling gear. Two coupler shafts on the output side of this coupling gear can be alternately connected with the output shaft of the power-distribution transmission, via a downstream connected three-shaft planetary gear. The first coupler shaft is in driving connection with a planet gear carrier and the second coupler shaft is in driving connection with a sun wheel of a second, three-shaft coupling gear. A hollow wheel of the second coupling gear is coupled with the output shaft via a third coupler shaft and via the downstream connected planetary gear.

BACKGROUND OF THE INVENTION

From EP-A 00 03 397 a load-shifting transmission having the above-mentioned characteristics has become known. Such a hydrostatic-mechanical power-distribution transmission presents a fine ratio subdivision, which is due to the combination possibilities of the planetary gear sets and the clutches. As a result, a good adjustment of the driving engine and working machine at favorable efficiency degrees can be achieved. In the prior-art transmission, the drawback consists in the fact that its constructive design leads to a construction unit having a relatively big axial length. A clutch between the hollow wheel of the second coupling gear and the output shaft is not provided. Besides, the clutches are arranged in the transmission in such a way that a central supply with control pressure and lubricants becomes quite cumbersome.

OBJECT OF THE INVENTION

It is the object of the present invention to improve a hydrostatic-mechanical power-distribution transmission of the aforementioned kind, so that a constructively clearly defined and easily accessible connection between the second coupling gear and the downstream connected planetary gear is created.

SUMMARY OF THE INVENTION

This basic object of the invention is achieved by arranging four clutches between the second coupling gear and the downstream connected planetary gear, through the first of these clutches the third coupler shaft can be connected with the sun wheel of the downstream connected planetary gear and through the second of these clutches the second coupler shaft can be connected with the sun wheel and through the third of these clutches the first coupler shaft can be connected with the planetary gear carrier of the downstream connected planetary gear, and through the second and fourth of these clutches, the second coupler shaft can be connected with the planetary gear carrier of the downstream connected planetary gear. The construction of the connection between the second coupling gear with the downstream connected planetary gear according to the invention leads to a particularly assembly-friendly construction unit for a total of four clutches. These clutches are arranged in pairs and arranged one after the other so that they can be centrally supplied with control pressure and lubricants.

A particularly favorable speed and torque transmission from the first four-shaft coupling gear to the second three-shaft coupling gear is achieved in a further embodiment of the invention, due to the fact that the first coupler shaft is a hollow wheel of a first planetary gear set and a planetary gear carrier of a second planetary gear set of the first coupling gear and that the second coupler shaft is a sun wheel of the first coupling gear.

It is advantageous to provide a reversing planetary gear set, whose planetary gear carrier is permanently connected with the output shaft and whose sun wheel is connected with the hollow wheel of the downstream connected gear, whereby further the hollow wheel of the reversal planetary gear set can be connected with the housing via a second brake. This way, the components required for the reversing operation are also constructively clearly defined and arranged so that they are easily accessible for maintenance operations.

In order to enhance the operational safety for the actuation elements of the downstream connected gear, it is advantageous to close the brakes by spring power and to open them by power assistance.

In order to tow the vehicle, in the driven shaft a disconnecting clutch is provided. The disconnecting clutch makes possible an uncoupling of the rear-axle differential from the transmission.

According to a further advantageous feature, an emergency operation of the transmission in case of control failure is made possible, due to the fact that over the first clutch and the brake which is engaged by spring force, the transmission can continue to operate in one speed.

BRIEF DESCRIPTION OF THE DRAWING

The above and other objects, features and advantages will become more readily apparent from the following, reference being made to the accompanying drawing in which:

The sole FIGURE is a diagrammatic view of a hydrostatic-mechanical power-distribution transmission according to the invention for an agricultural tractor.

SPECIFIC DESCRIPTION

A driving shaft 1 drives an adjustable hydrostatic unit 3 via a transmission gear 2 and a primary shaft 5 of a four-shaft coupler gearing 6 via a transmission gear 4. The adjustable hydrostatic unit 3 cooperates with the hydro constant unit 7. The hydro constant unit 7 drives a second primary shaft 9 of the coupler gearing 6, via a transmission gear 8. The coupler gearing 6 comprises two three-shaft planetary gear sets 10 and 11. The primary shaft 5 is connected with the one planetary gear carrier 12 of the planetary gear set 10. The planetary gear set 10 comprises planetary gears 13. The primary shaft 9 is rigidly connected with a sun gear 16 of the second planetary gear set 11. A sun gear 17 of the first planetary gear set 10 is fastened on a coupler shaft 18. A planetary gear carrier 19 of the second planetary gear set 11 is connected with a hollow wheel 20 of the planetary gear set 10 and a coupler shaft 21. The coupler shafts 18 and 21 are connected with a second coupler gearing 23, which presents a planetary gear set 23A. A sun gear 22 of this planetary gear set 23A is connected with the sun gear 17 of the first planetary gear set 10 and the planetary gear carrier 19 of the second planetary gear set 11 is connected with a planetary gear carrier 24 of the planetary gear set 23A, via the coupler shaft 21.

On the hollow wheel 25 of the planetary wheel set 23A, drive disks 26 of a clutch 29 are nonrotatably mounted. These driven disks 26 engage between the drive disks 27 nonrotatably mounted on the shaft 28.

On the coupler shaft 18, a clutch carrier 30 is mounted, which, via nonrotatable driven disks 31, engages between the drive disks 27 of a clutch 33, which are nonrotatably mounted on shaft 28.

On an intermediate shaft 24 rigidly connected to the coupler shaft 21, drive disks 35 of a clutch 38 are nonrotatably mounted. These engage between the drive disks 36 which are nonrotatably mounted on a shaft 37.

The shaft 28 comprises nonrotatable driven disks 39 engaging between drive disks 36 of a clutch 41.

The shaft 28 is rigidly connected with a sun wheel 42 of a planetary gear set 43. The shaft 37 carries planetary gears 44 of the planetary gear set 43. A hollow wheel 45 of the planetary gear set 43 can be connected via disks 46 of a brake 47 with a transmission housing 48. The shaft 37 is rigidly connected with a transmission output shaft 48. The hollow wheel 45 of the planetary gear set 43 is rigidly connected with a sun gear 49 of a planetary gear set 50. A planetary gear carrier 51 of the planetary gear set 50 is rigidly connected with the transmission output shaft 48. A hollow wheel 52 of the planetary gear set 50 can be connected with the transmission housing via disks 53 of a brake 54.

The transmission output shaft 48 is provided with a pinion 55, which can for instance drive a crown gear 56 of a rear axle (not shown in the drawing) of the vehicle. Via a transmission gear 57 and a disconnecting clutch 58, a shaft 59 leading to a further axle (not shown in the drawing) can be driven.

Inside the transmission output shaft 48, a clutch 60 is arranged. The driving shaft 1 can be connected via a power take-off shaft coupling 61 with a power take-off shaft 6 exiting the transmission and provided with a transmission gear 63. Furthermore, in the connection between the hollow wheel 45 and the sun wheel 49, a disconnecting clutch 64 is provided.

Modus operandi: Via the driving shaft 1, the hydrostatic unit 3 and the primary shaft 5 are driven proportionally up to the speed of a motor vehicle. By adjusting the volume of delivery of the hydrostatic unit 3, the hydro constant unit 7 is accelerated and the hollow wheel 25 of the planetary gear set 23A is brought to speed 0, due to the summation of speeds of the input shafts 5, 9 in the coupling gears 6 and 23. When the rotation speed 0 of the hollow wheel 25 is reached, the clutch 29 closes. The sum of power output coming from the hydrostatic and the mechanical branches 3, 5, flows over the sun wheel 17, the planetary gear carrier 19, the coupler shafts 18, 21 and the hollow wheel 25 of the planetary gear set 23A, the clutch 29 and the sun 42 into the fourth planetary gear set 43. The brake 47 is closed, and the hollow wheel 45 stands still. The power output flows over the planetary gear carrier 37 into the driven shaft 48.

The further variation of the transmission ratio of the power-distribution transmission is achieved due to a further adjustment of the hydrostatic unit 3. If after running through the first operation range the hollow wheel 25 has reached a synchronous speed with the speed of the clutch carrier 30, the clutch 33 closes and the clutch 29 opens. After that, the sum of the power output of the mechanic and hydrostatic branches 5, 9, flows over the sun wheel 17 of the first planetary gear 10, the coupler shaft 18 and the closed clutch 33. The further power flow in this second operational range takes place over the sun 42, and, when the brake 47 is closed and the hollow wheel 45 stands still, over the planetary gear carrier 37 to the transmission output shaft 48.

In order to shift to the third operational range, the clutch 38 is closed when the speeds of the clutch 33 and the hollow wheel 34 are synchronized, and then the clutch 33 is immediately opened. The combined output coming from the mechanical and hydrostatic branches 5, 9 flows thereby over the coupler shaft 21 and the hollow wheel 34 over the clutch 38 in the planetary gear set 37, and into the transmission output shaft 48 when the brake 47, 54 is open.

The fourth operation range is reached by closing the clutches 33 and 41 when the speed is synchronized with clutch 33, immediately thereafter followed by the opening of clutch 38. The sum of the power output coming from the mechanical and hydrostatic branches flows then over the sun 17 of the first planetary gear set 10 over the clutch 33 and the clutch 41, and when the brakes 47, 54 are open, over the planetary gear carrier 37 into the transmission output shaft 48.

A reversal of the rotation direction of the transmission output shaft 48 takes place due to the closing of brake 54 and the arresting of the hollow wheel 52 of the planetary gear set 50.

A first operation range in this reversed direction of rotation results from the summation of the mechanical and hydrostatic power output 9, 5 in the sun shaft 17 of the first planetary gear set 10. and the planetary gear carrier 19 of the second planetary gear set 11. Thereafter, the power output flows via the hollow wheel 25 of the planetary gear set 23A when the clutch 29 is closed over the sun 42 into the planetary gear set 43. When the brake 47 is open, the power output flows over the hollow wheel 45 to the sun 49 of the planetary gear set 50 and over the planetary gear carrier 51 into the transmission output shaft 48. A fraction of this power output flows back to the web of the planetary gear set 43 and overlaps there with the normal local drive output.

A second operational range in this reversed direction of rotation of the transmission output shaft 48 is achieved by closing the clutch 33 and the immediately subsequent opening of clutch 29. The summed power output of the mechanical and hydrostatic branches flows then over the sun 17 of the first planetary gear set 10 over the clutch 33, the sun 42, the hollow wheel 45 and when the brake 54 is closed over the planetary gear carrier 51 of the planetary gear set 50 to the transmission output shaft 48.

When the control of the transmission fails, the power-distribution transmission can continue to operate in one speed. The brakes 47 and 54 as well as clutch 29 are closed by spring force, whereby by means of the disconnecting clutch 64 the planetary gear set 50 serving as a reversal step, is separated. A towing of the vehicle equipped with the power-distribution transmission becomes possible after the opening of the disconnecting clutch 60.

We claim:

1. A hydrostatic-mechanical power-distribution transmission, comprising:
   a housing;
   a driving shaft rotatably mounted on said housing;
   a driven output shaft in said housing spaced from said driving shaft;
   a hydrostatic power unit in said housing operatively connected with said driving shaft,
   a first four-shaft coupling gear having first and second output coupler gear shafts and operatively connected with said driving shaft and hydrostatic power unit;
   a three-shaft second coupling gear having a third output coupler shaft downstream of said first coupling gear and being formed with:
      a sun-wheel being in constant driving contact with said second output coupler shaft,
      a planetary carrier in driving contact with said first output coupler shaft, and
      a hollow wheel connected with said third output coupler shaft of said second coupling gear;
   at least one planetary gear on said housing downstream of said second coupling gear operatively connected with said third output coupler shaft and with said driven output shaft, said planetary gear connecting alternatively said first and second output coupler shafts with said driven output shaft and being formed with a respective sun-wheel and with a respective planetary gear carrier; and
   coupling means for producing first, second, third, fourth and reverse transmission ranges mounted on said housing between said second coupling gear and said planetary gear, said coupling means comprising:
      a first clutch connecting said hollow wheel of said second coupling gear with the sun wheel of said downstream planetary gear operatively connected with said driven output shaft providing thereby the first range,
      a second clutch connecting the second coupler shaft of said first coupling gear with the sun wheel of said planetary gear connected with said driven output shaft thereby providing the second range,
      a third clutch connecting the first coupler shaft of said first coupling gear with the planetary gear carrier of said planetary gear connected with said driven output shaft defining thereby a third range, and
      a fourth clutch operatively connected with said second clutch in the fourth range defined by the second coupler shaft connected with the planetary gear carrier of said planetary gear.

2. The power-distribution transmission defined in claim 1 wherein said first four-shaft coupling gear includes first and second planetary gear sets, said first and second coupler shafts being a hollow wheel of said first planetary gear set, said planetary gear carrier of said second planetary gear set and said first coupler shaft being respective sun wheels.

3. The power-distribution transmission defined in claim 1 wherein said planetary gear includes a third gear set and a reversing planetary gear set downstream of said third gear set and formed with a respective planetary gear carrier connected with the driven output shaft and with a respective sun wheel connected with a hollow wheel of said third gear set, said coupling means including first and second brakes, said hollow wheel of the reversing planetary gear set being connected with said housing via said second brake.

4. The power-distribution transmission defined in claim 3 wherein a disconnecting clutch is provided between the hollow wheel of the third set of said planetary gear and the sun wheel of said reversing gear set.

5. The power-distribution transmission defined in claim 3 wherein said brakes are closed by a spring force and opened by power assistance.

6. The power-distribution transmission defined in claim 1 wherein said output driven shaft is provided with a connecting clutch.

7. The power-distribution transmission defined in claim 1 wherein said clutches are spring-loaded, said clutches being opened by power assistance.

* * * * *